United States Patent [19]

Meiller

[11] 4,112,185

[45] Sep. 5, 1978

[54] MODIFIED MINERAL SUPPORTS

[75] Inventor: François Meiller, Palaiseau, France

[73] Assignee: Rhone-Poulenc Industries, Paris, France

[21] Appl. No.: 607,094

[22] Filed: Aug. 25, 1975

[30] Foreign Application Priority Data

Aug. 30, 1974 [FR] France ................. 74 29702

[51] Int. Cl.² .......................... B32B 5/16; B32B 9/00
[52] U.S. Cl. ................... 428/403; 106/308 Q; 106/308 N; 260/37 EP; 428/323; 428/329; 428/331; 428/332; 428/404; 428/407; 428/413
[58] Field of Search ............... 428/323, 329, 331, 332, 428/402, 403, 407, 413, 540; 260/37 EP, 2.1 R, 2 EC; 106/308 Q, 308 N; 252/179

[56] References Cited

U.S. PATENT DOCUMENTS

| | | | |
|---|---|---|---|
| 3,396,138 | 8/1968 | Weller | 428/413 |
| 3,639,344 | 2/1972 | Kinneman, Jr. et al. | 428/413 |
| 3,811,911 | 5/1974 | Doi | 428/413 |
| 3,969,261 | 7/1976 | Meiller | 428/447 |

FOREIGN PATENT DOCUMENTS 519,230  12/1955  Canada ................. 427/220

*Primary Examiner*—George F. Lesmes
*Assistant Examiner*—P. J. Thibodeau
*Attorney, Agent, or Firm*—McDougall, Hersh & Scott

[57] ABSTRACT

Modified porous mineral carriers in which the surfaces are covered by a cross-linking polymer formed by reaction of at least one polyamine with at least one epoxide compound.

7 Claims, No Drawings

MODIFIED MINERAL SUPPORTS

The invention concerns porous materials comprising mineral carriers modified by coating their surface by means of a cross-linked polymer. The invention also concerns a process of producing such materials.

The porous materials formed by mineral carriers on which are grafted functional groups such as silanes carrying various substituents, are known products. Use of such products, however, is limited because they age more or less rapidly. In fact, when such products are put to some uses, there is irreversible elution which causes the graft functional groups progressively to disappear.

Also, cross-linked polymers based on amines and epoxidic compounds have been described as ion-exchanger resins, but they have not been put to commercial use because of certain defects, such as swelling in water, lack of mechanical properties, lack of resistance to solvents, and the impossibility of sterilizing them.

The porous materials of the present invention do not suffer from these disadvantages. They do not age, they are substantially insensitive to water and solvents, have excellent mechanical strength, can be sterilized, and have inter alia good ion-exchanger properties.

These materials comprise modified mineral carriers, characterized in that the entire surface of the carrier is covered with a cross-linked polymer resulting from the reaction of at least one polyamine on at least one epoxidic compound.

The mineral carrier must have a grain size range of from $5\mu$ to 5mm, a specific surface area of the order of from 2 to 1000 sq.m/g, a pore diameter of from 50 to 10,000Å and a pore volume of 0.5 to 1.3 ml/g. Carriers which comply with these characteristics include brick, kieselguhr, aluminas, mineral silicates, metal oxides and more particularly silicas, and the above-mentioned carriers on which have been grafted functional groups, in particular groups containing silicon atoms and possibly nitrogen atoms, for example the porous substances described in French Pat. No. 2,147,382 and in French patent application No. 73.25698 filed on July 13, 1973 and entitled "Porous substances having ion-exchanger properties" (corresponding to U.S. Ser. No. 486,819, filed July 10, 1974 and now U.S. Pat. No. 3,969,261). These carriers are selected, according to the uses envisaged, in dependence on their porosity. If necessary, they can be degassed before coating, in accordance with any known processes.

The epoxidic compounds which are involved in the composition of the cross-linked polymer are represented by epichlorohydrin, and the di-epoxidic compounds which have a straight, branched or cyclic carbon chain, possibly comprising one or more heteroatoms such as oxygen atoms, sulfur atoms and more particularly nitrogen atoms; and halogen atoms or hydroxy, aryl or cyano groups.

Carbon-chain di-epoxidic compounds include inter alia 1,2,3,4 diepoxybutane, diglycidyl, di-epoxy divinylbenzene, diepoxy vinylcyclohexane.

The di-epoxidic compounds, whose chain comprises at least one oxygen atom, are produced by means of any known processes and for the most part by the reaction of epichlorhydrin with a glycol. These are in particular diglycidylether, diglycidylethers of methylene, ethylene, butanediols, bisphenol A, hydroquinone, resorcin, polyethyleneglycol and polypropyleneglycol.

The di-epoxidic compounds whose chain comprises at least one sulfur atom are produced using any known processes, such as the reaction of epichlorohydrin on dithiols. Mention can be made inter alia of glycidylsulfide and dimethylbenzene diglycidylthioether.

The di-epoxidic compounds whose chain comprises at least one nitrogen atom are produced using any known processes, by reacting epichlorohydrin with ammonia, primary amines or primary and/or secondary polyamines whose organic residue comprises more particularly an alkyl (1–5 C), haloalkyl (1–5 C), cyanoalkyl (1–5 C), dialkyl (1–2 C), aminoalkyl (1–5 C), aryl or pyridyl group.

The following can be mentioned as examples of amines giving di-epoxidic compounds with epichlorohydrin; butylamine, bromoethylamine, cyanoethylamine, diethylaminopropylamine, N,N-dimethylethylene-diamine, N,N-bis(2-hydroxyethyl)1,3-diaminopropane, aniline, aminopyridine, ethylenediamine, and diethylenetriamine.

Associated with such epoxidic compound or compounds can be one or more mono-epoxidic compounds with a straight or branched chain in which the number of carbon atoms is less than or equal to 10, or a cyclic chain, which contains at least one nitrogen atom and possibly an aryl group. These are, for example, dialkylamino 2,3-epoxypropane, whose alkyl group contains from 1 to 3 carbon atoms, or 2,3-epoxy propylaniline.

These compounds are used more particularly when a large amount of nitrogen atoms is required in the cross-linked polymer, in particular when the di-epoxidic compound does not comprise a nitrogen atom.

The amount of mono-epoxidic compound represents from 0 to 60% by weight of the mixture of epoxidic compounds.

The term polyamines, which react with the epoxidic compound or compounds to give the cross-linked polymer, means primary and/or secondary aliphatic, cyclanic or aromatic compounds, which are possibly substituted by hydroxyalkyl groups having from 2 to 3 carbon atoms. The following can be mentioned as examples of polyamines which comply with this definition: ethylenediamine, diethylenetriamine, triethylenetetramine, tetraethylenepentamine, N-aminoethylethanolamine, N-(hydroxyethyl)diethylenetriamine, N-(hydroxypropyl)diethylenetriamine, N,N-dimethylaminopropylamine, N,N-diethylaminopropylamine, N,N-diethylpentane, 1,4-diamine, phenylenediamines, N,N'-bis(hydroxyethyl)diethylenetriamine, N,N'-bis(hydroxyethyl)triethylenetetramine, N,N'-dimethylethylenediamine, N-methylpiperazine, and N-($\beta$-hydroxyethyl)piperazine.

The epoxidic compound or compounds and the polyamine or polyamines selected depend on the properties and the uses of the porous material. Thus, it is known that the exchange capacity of a product increases as the number of nitrogen atoms which it contains also increases. If a material having a large exchange capacity is desired, it will be necessary to use at least one epoxidic compound and at least one polyamine, both of which have a high nitrogen content. In contrast, in the case of uses which do not require any ion-exchanger properties, an epoxidic compound which does not contain nitrogen atoms and a polyamine which contains the minimum of nitrogen atoms are reacted.

According to the invention, the porous materials are prepared by impregnating the mineral carrier with a solution of the reaction product of at least one epoxidic compound and at least one polyamine which is prepared previously or in situ, evaporation of the solvent, and cross-linking of the reaction products by heat.

The epoxidic compound and the polyamine, as defined above, are employed in amounts such that the proportion of polyamine is from the stoichiometric amount to 250% by weight with respect to the epoxidic compound.

In the case where the epoxidic compound or compounds and the polyamine or polyamines are reacted before impregnation of the carrier and cross-linking, this reaction is carried out at a temperature of the order of from 0° to 100° C. This reaction often being very quick, it may be of advantage for the reaction to be carried out in solution in any solvent for the reaction products and the products to be produced, which solvent is inert with respect to said products and which has a boiling point less than or equal to 100° C. These are, for example, water, benzene, ether, acetone, methylenechloride and alcohols, ensuring, as regards the last, that operation is at temperatures which are sufficiently low to prevent the alcohol reacting with the epoxidic compound or compounds.

In the case of epichlorohydrin, its products of reaction with the polyamine can be highly reactive, the subsequent cross-linking occurring as soon as heat is applied. On the other hand, when the product of reaction of the epoxidic compound or compounds with the polyamine or polyamines is substantially unreactive, it is necessary to remove the chlorine atom by the addition inter alia of sodium hydroxide, potassium hydroxide, or sodium aluminate, in a molar amount relative to chlorine. Cross-linking can then be carried out without difficulty.

After reaction of the epoxidic compound or compounds with the polyamine or polyamines, the product obtained can be separated from the medium, but it is preferable to employ it in its solution.

To impregnate the carrier, the amounts of polyamine(s) and epoxidic compound or compounds in mixture or their reaction product represent from 1 to 60% by weight with respect to the carrier.

The impregnation medium comprises any solvent for the epoxidic compound or compounds and the amine or amines or their reaction product, which wets the carrier, with a boiling point of less than or equal to 100° C. This is represented by water, benzene, ether, acetone, methylenechloride or alcohols. It may be identical to or different from that used for producing the reaction product of the epoxidic compound or compounds and the polyamine or polyamines. The amount of solvent used must be such that all the carrier is in contact therewith, which represents at minimum 100% by volume of the carrier.

When the carrier is impregnated, the solvent is removed by means of any known processes, such as distillation, placing under vacuum, evaporation under normal pressure, in a thin layer or in a rotary evaporator, leaving on the surface of the carrier a mixture of the epoxidic compound and polyamine, or their reaction product.

Cross-linking is then produced by heating the coated carrier at a temperature between ambient temperature and 150° C., depending on the nature and the reactivity of the products deposited on the carrier, for a period of from 3 to 48 hours.

It is apparent that the removal of the solvent and cross-linking can be effected simultaneously.

The resulting materials comprise carriers whose entire surface is covered with a cross-linked polymer which is solidly fixed to the carrier and which has mechanical properties not possessed by cross-linked polymers, without the presence of a carrier.

The materials can thus be sterilized, stacked without any subsidence and used without damage.

The materials, according to the invention, can be used as industrial catalyst carriers, carriers for fixing enzymes, and very high quality basic ion exchangers.

Embodiments of the invention are given hereinafter by way of example and without limitation.

EXAMPLE 1

A solution of 92.5 g of epichlorohydrin in 25 g of methanol is added dropwise to a solution of 30 g of ethylenediamine in 41 g of water with stirring.

When the addition operation is completed, the reaction medium is raised to a temperature of 60° C.

The viscous, clear, yellowish solution produced is heated at 100° C. at 20 mm Hg to remove the water and methanol. There remains a hard product which has begun to polymerize.

3 g of the resulting product is dissolved in 180 ml of methanol and the solution is used to impregnate 100 g of silica, which has a grain size range of 100 to 200 $\mu$, a specific surface area of 129 sq.m/g, a pore diameter of 280 Å and a pore volume of 1.1 ml/g.

The methanol is then evaporated, then the silica is heated at 140° C. for 3 hours to effect cross-linking.

Analysis of the silica shows that it contains:

0.9% by weight of carbon and 0.25% by weight of nitrogen.

The silica is placed in a column. After elution of 30 l of water, analysis gives:

1% carbon and 0.24% of nitrogen.

It is found that the impregnated silica has a good level of stability. Its appearance is unchanged.

By way of comparison, the operation is repeated, but without silica. The resin produced in the form of grains is placed in a column. After elution of 30 l of water, the resin has swollen 200% in volume. This resin, when dried, remains in its swollen form, is extremely friable and unusable.

EXAMPLE 2

27.8 g of epichlorohydrin is added dropwise to a solution of 18.9 g of tetraethylenepentamine in 55 g of water, which is stirred and maintained at 4° C. After the introduction operation, the solution is kept under agitation for 1 hour at 4° C., then for 1 hour 30 minutes at 10° C. and finally for 45 minutes at 20° C.

To this solution there is then added a solution of 2 g of sodium hydroxide in 110 ml of water and the resulting substance is used to impregnate 150 g of silica whose grain size range is from 100 to 200 $\mu$, with a specific surface area of 45 sq.m/g, a pore diameter of 600 Å, and a pore volume of 1.1 ml/g.

The impregnated silica is heated at 100° C. for 15 hours in order to remove the water and to cause cross-linking to occur.

The silica has the following characteristics:

C: 9.8% — N: 2.5%

After 4 hours in acetone at boiling temperature, its characteristics are:

C: 10% — N: 3% then after 4 hours in water at boiling temperature:

C: 10.1% — N: 2.7%

The exchange capacity of the silica, after treatment with N/10 hydrochloric acid in order to quaternize the nitrogen, is measured by the exchange of the chloride ion by a N/10 sodium nitrate solution; a value of 1.2 m.eq/g is obtained.

The same test is carried out, but the silica used has a grain size range of 40 to 100 μ, a specific surface area of 50 sq.m/g, a pore diameter of 600 Å and a pore volume of 1.2 ml/g.

Analysis gives:
C: 10.2% — N: 3.35%
and after 4 hours in boiling water:
C: 10.2% — N: 3.3%

EXAMPLE 3

50 g of silica, having a grain size range of 100 to 200 μ, a specific surface area of 44 sq.m/g, a pore diameter of 600 Å and a pore volume of 1.2 ml/g, is degassed by the addition of its volume of methylenechloride. A solution in 100 ml of methylenechloride of 10 g of N,N-bis(2,3-epoxypropyl)butylamine and 4 g of triethylenetetramine is then added to the silica.

The methylenechloride is evaporated in air at ambient temperature, then the silica is heated at 70° C. to cause cross-linking.

Analysis gives:
C: 11.3% — N: 2.4%

After 4 hours in acetone at boiling temperature, analysis is unchanged and after 4 hours in water at boiling temperature, it is as follows:
C: 10.5% — N: 2.5%

The exchange capacity is 1.2 m.eq/g.

EXAMPLE 4

The carrier is a silica having a grain size range of 100 to 200 μ, a specific surface area of 50 sq.m/g and a pore volume of 1 ml/g, which is treated by a silane having the formula:

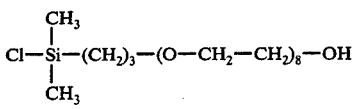

60 g of graft silica are impregnated with 150 ml of methylenechloride containing 12 g diglycidylether and 0.6 g of triethylenetetramine.

The methylenechloride is evaporated in air at ambient temperature, then the silica is heated for 48 hours at 90° C. to effect cross-linking.

Analysis of the silica gives:
C: 8.2% — N: 0.4%

After 8 hours boiling in water, a test which is very severe for silica, analysis gives:
C: 7.1% — N: 0.2%

EXAMPLE 5

250 ml of methylenechloride containing 20g of butane 1,4-dioldiglycidylether and 3 g of triethylenetetramine are added to 100 g of silica having a grain size range of 100 to 200 μ, a specific surface area of 44 sq.m/g, a pore diameter of 600 Å, and a pore volume of 1.2 ml/g.

The methylenechloride is evaporated in air at ambient temperature, and cross-linking is carried out at 80° C. for a period of 6 hours.

Analysis:
C: 12% — N: 0.6% and after 8 hours boiling in water
C: 10.5% — N: 0.44%

EXAMPLE 6

94 g of 2-aminopyridine is dissolved in 500 ml of benzene at 70° C. The solution is added to 200 g of epichlorohydrin at 70° C., then the mixture is maintained for 1 hour at 70° C. After cooling with agitation to 20° C., 130 g of sodium hydroxide in solution in 300 ml of water is added over a period of 20 minutes and then the temperature is maintained at 20° C. with agitation for 2 hours.

300 ml of water is then added, followed by decantation, neutralization of the organic layer, and drying.

250 ml of benzene, containing 10 g of triethylenetetramine, and 60 ml of the benzenic solution containing 20 g of N,N-bis(2,3-epoxypropyl) aminopyridine formed are successively added to 100 g of silica having a grain size range of 100 to 200 μ, a specific surface area of 400 sq.m/g, a pore diameter of 80 Å, and a pore volume of 1.3 ml/g.

The benzene is evaporated hot under vacuum and the silica is heated for 24 hours at 100° C.

The silica produced contains:
C: 5.7% — N: 2.1%.

After 8 hours boiling in water, the proportion of carbon is 4.9% and that of nitrogen is 1.7%.

EXAMPLE 7

130 g of diethylaminopropylamine is added dropwise to a solution of 200 g of epichlorohydrin in 300ml of benzene which is heated to 63° C. The temperature of the medium rises to 90° C. during the operation of addition. The resulting solution is then maintained at 60° C. for 2 hours.

After cooling, 132 g of sodium hydroxide in solution in 300 ml of water is added, cooling being carried out to hold the temperature at 35° C. After decantation the benzene layer is dried and the benzene is evaporated, giving 225 g of N,N-bis(2,3-epoxypropyl)diethylaminopropylamine, in a liquid form, the epoxy index of which is 7.5 (theoretical 8.2).

20 g of epoxy and 2 g of triethylenetetramine is dissolved in 250 ml of methylenechloride, and the resulting solution is added to 100 g of silica, with a grain size range of 100 to 200 μ, a specific surface area of 400 sq.m/g, and a pore volume of 1.1 ml/g.

The solvent is evaporated at ambient temperature, then the silica is heated for 36 hours at 100° C.

Analysis gives:
C: 12.1% — N: 4.3%, and after 8 hours boiling in water:
C: 11.5% — N: 3.7%

EXAMPLE 8

20 g of N,N-bis(2,3-epoxypropyl)diethylaminopropylamine of Example 7 and 2 g of triethylenetetramine are dissolved in 250 ml of methylenechloride, and the resulting solution is added to 100 g of alumina, with a grain size range of 0.9 to 1.2 mm, a specific surface area of 250 sq.m/g, and a pore volume of 0.9 ml/g.

After evaporation and heating, as in Example 7, analysis shows that the alumina contains 17% carbon and 4.35% of nitrogen.

After boiling in water for 8 hours, the proportion of carbon is 3.3% and that of nitrogen is 1.4%.

EXAMPLE 9

100 g of balls of silica gel having a grain size range of 100 to 200 μ, a specific surface area of 50 sq.m/g and a pore volume of 1.2 ml/g are introduced into a balloon flask. The balls are dried under a stream of nitrogen, at normal pressure, for a period of 3 hours at 150° C.

20 g of triethoxydiethylaminopropylsilane dissolved in 200 ml of xylene is then added, and heating under reflux is effected for 8 hours. After cooling, the silica balls on which silane groups are grafted are drained and dried.

250 ml of methylenechloride is added to 100 g of the balls obtained, followed with agitation, by 20 g of N,N-bis(2,3-epoxy propyl)butylamine and 8 g of triethylenetetramine.

The methylenechloride is then evaporated at ambient temperature, then the balls are heated for 24 hours at 80° C.

Analysis is as follows:
C: 13.5% — N: 3.2%, and after 8 hours boiling in water:
C: 12.65% — N: 3%

EXAMPLE 10

100 g of silica, having a grain size range of 100 to 200 μ, a specific surface area of 44 sq.m/g, a pore diameter of 600 Å and a pore volume of 1.2 ml/g are degassed by the addition of their volume of methylenechloride.

20 g of N,N-bis(2,3-epoxy propyl)aniline and 4 g or triethylenetetramine in solution in 200 ml of methylenechloride are added to the silica. The silica is then left for 24 hours at 25° C. to evaporate the methylenechloride and produce cross-linking.

Analysis shows that there is 13.5% of carbon and 1.8% of nitrogen on the silica.

After 8 hours in water at boiling temperature, the proportion of carbon is still 13.4% and that of nitrogen is 1.6%

EXAMPLE 11

Example 10 is repeated with 13 g of butane 1,4-dioldiglycidylether, 13 g of diethylamine 2,3-epoxy propane and 6 g of triethylenetetramine, instead of the N,N-bis(2,3-epoxy propyl)aniline and the triethylenetetramine.

After evaporation in the air at ambient temperature of the methylenechloride, the silica is heated for 6 hours at 80° C. to produce cross-linking.

Analysis shows that there is 15% of carbon and 3.1% of nitrogen and after 8 hours in water at boiling temperature, 14.1% of carbon and 2.6% of nitrogen.

I claim:

1. Porous mineral support materials comprising modified mineral carriers having a grain size range of from 5 μ to 5 mm, a specific surface area of from 2 to 1000 sq.m/g, a pore diameter of from 50 to 10,000 Å, and a pore volume of 0.5 to 1.3 ml/g said carrier being in the form of particles coated with a cross-linked polymer formed of the reaction of at least one polyamine on at least one epoxidic compound and present in an amount within the range of 1–60% by weight of the carrier.

2. Materials according to claim 1, in which the carrier is selected from the group consisting of brick, kieselguhr, mineral silicates, or metal oxides.

3. Materials according to claim 1, in which the epoxidic compounds are selected from the group consisting of epichlorohydrin and di-epoxidic compounds with a straight, branched or cyclic carbon chain, with or without one or more heteroatoms, oxygen, sulfur, or nitrogen, and halogen atoms, hydroxy, aryl or cyano groups.

4. Materials according to claim 1, in which a mono-epoxidic compound with a straight or branched chain, having no more than 10 carbon atoms or a cyclic chain, containing at least one nitrogen atom with or without an aryl group, can be associated with the epoxidic compound.

5. Materials according to claim 1, characterized in that a mono-epoxidic compound represents from 0 to 60% by weight of the total of the epoxidic compounds.

6. Materials according to claim 1, in which the polyamines are selected from the group consisting of primary and/or secondary, aliphatic, cyclanic or aromatic, with or without hydroxyl alkyl groups having 2 or 3 carbon atoms as substituents.

7. Materials according to claim 1, in which the amount of polyamine is between the stoichiometric amount and 250% by weight with respect to the epoxidic compound.

* * * * *